United States Patent Office 3,764,348
Patented Oct. 9, 1973

3,764,348
PRESERVATION OF PEACHES FOR
SUBSEQUENT PROCESSING
Charles C. Huxsoll and James D. Ponting, El Cerrito, Calif., assignors to the United States of America as represented by the Secretary of Agriculture
No Drawing. Filed Mar. 17, 1972, Ser. No. 235,820
Int. Cl. A23b 7/10; A23l 3/34
U.S. Cl. 426—310                         2 Claims

ABSTRACT OF THE DISCLOSURE

Technique for preserving peaches in a fresh state pending their final processing as by canning, freezing, or the like. Example: Fresh peaches are halved and pitted, dipped in an aqueous solution of calcium chloride and ascorbic acid, and then stored in a dilute aqueous solution of citric acid or lactic acid or mixtures thereof. When circumstances warrant, the peaches are withdrawn from the solution in which they are being stored, and further processed in conventional manner.

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

The invention relates to and has among its objects the provision of a novel process for preserving fresh peaches. More particularly, the invention pertains to the pre-processing of peaches so that they can be stored for extended periods of time without deterioration prior to final processing. Further objects of the invention will be evident from the following description wherein parts and percentages are by weight unless otherwise specified.

An anuually-recurring problem in the peach canning industry is caused by the difficulty of matching intake of fresh fruit with operating capacity and schedules. When the peach crop is harvested the processor is inundated with a large supply of fruit which because of its perishable nature must be quickly processed. Under ideal conditions it is difficult to achieve the desired end of processing all the available fruit while it is in good condition, and in actuality unpredictable factors such as machinery breakdowns, shortages of critical supplies, delays in shipping, labor shortages, etc. invariably militate against a successful campaign.

In view of the foregoing explanation, one can readily appreciate that there is need for extending the period over which the fruit can be successfully processed. It is a primary object of the invention to fulfill this need. The invention provides the means whereby peaches can be preserved in a fresh state pending their final processing, with the result that the necessity for haste is eliminated and the processor can readily match his operating schedules to the supply of fruit.

In accordance with the invention, pitted peach halves are first dipped into an aqueous solution of calcium chloride and ascorbic acid. The so-dipped peach halves are then stored in a dilute aqueous solution of citric acid, or lactic acid or mixtures thereof until such time as they are to be canned.

A primary advantage of the invention is that the fruit is maintained in a fresh state with retention of its natural appearance, texture, color, and flavor. This is in sharp contrast to procedures which have been suggested for relieving the problem outlined above. For instance, it has been advocated that the whole fresh fruit be held in cold storage pending final processing. Such treatment does not yield satisfactory results. Peaches continue to mature even after they are harvested, and cold storage does not arrest this continuing maturation. Consequently, if the fruit is kept in cold storage for a period longer than a few weeks, it is too ripe or mushy for canning purposes. Methods of preservation which involve freezing are also unsatisfactory. When the fsozen fruit is thawed, its texture is altered (softened) so that it is not suitable for canning.

It is also to be emphasized that the process of the invention is simple, economical, and can be carried out with equipment commonly available at canneries.

DETAILED DESCRIPTION OF THE INVENTION

The practice of the invention is further explained in detail below.

In a preliminary operation, fresh peaches are halved and pitted in conventional manner. The peaches may also be peeled, but we have found that best results are obtained where the peel is left on the fruit.

The peach halves are then dipped in an aqueous solution containing about 0.1 to 0.5% of calcium chloride and about 0.5 to 2% of ascorbic acid. The solution can be maintained at ambient (room temperature) but preferably is hot, that is, at a temperature of about 120–180° F. The peach halves are held in the solution for a period of about 3 to 10 minutes, depending on such factors as the concentration and temperature of the solution, a shorter time being sufficient at the higher concentration and higher temperature.

The peach halves are then removed from the dipping solution and transferred to a tank or other vessel where they are to be stored. The free space in the vessel is then filled with an aqueous solution of citric acid, lactic acid, or mixtures thereof. Generally, the concentration of acid is about 0.25 to 0.5%. The storage of the peach halves is under anaerobic conditions. Such conditions are readily attained by displacing any air in the headspace of the tank with nitrogen, carbon dioxide, helium, or other inert (that is, non-oxidizing) gas. Following this, the tank is covered with a suitable lid. Alternatively, the tank may be filled to the top with liquid so there is no headspace remaining and the tank then covered. Other means of securing anaerobic conditions will, of course, be apparent to those skilled in the art. The composite of peach halves and surrounding acidified liquor is stored under cool conditions, i.e., about 30–35° F. So stored, the fruit can be maintained in fresh condition for a period up to about 6 to 8 months.

When circumstances warrant (such as availability of equipment or receipt of orders for products), the peach halves are removed from the acidified liquor and processed in conventional manner. For example, the peach halves may be lye-peeled and then canned in the usual manner. An important aspect of the invention is that the preservation of the fruit in the manner described requires no change in the procedure customarily used for directly canning the fresh fruit. Our investigations have shown that the preservation process of the invention maintains the appearance, texture, color, and flavor of the peaches, and that the canned products made therefrom are indistinguishable from those prepared by directly canning the fresh fruit.

The invention is further demonstrated by the following illustrative example. Some of the experiments described below are not representative of the invention; they are included for purpose of comparison.

Fresh, pitted Cling peach halves were obtained from a local supplier and were processed as described below within one hour after being halved and pitted. The peaches were separated into 1-pound lots and treated as follows:

Lot 1: No dip. Stored in a plastic bag in an atmosphere of nitrogen gas.

Lot 2: No dip. Stored in 0.5% aqueous citric acid solution.

Lot 3: Dipped 3 minutes in aqueous solution of 0.5% calcium chloride and 2% ascorbic acid at ambient (room) temperature. Stored in 0.5% aqueous citric acid solution.

Lot 4: Dipped 5 minutes in aqueous solution of 0.5% calcium chloride and 2% ascorbic acid at 130° F. Stored in 0.5% aqueous citric acid solution.

Lot 5: Same dip as in Lot 4. Stored in 0.5% aqueous lactic acid solution.

Lot 6: Same dip as in Lot 4. Stored in aqueous solution of 0.25% citric acid and 0.25 lactic acid.

All the lots were stored at 32° F. for 7 weeks. In the case where the fruit was stored in acidified liquor (Lots 2–5), anaerobic conditions were obtained by filling a jar completely with fruit and liquor and then covering it with a lid.

After the 7-week storage period, the products were examined and evaluated for appearance, texture and aroma. The results are summarized in the following table.

tially anaerobic conditions at a temperature of about 30–35° F. while immersed in a solution consisting solely of water and about 0.25 to 0.5% of an acid selected from the group consisting of citric acid, lactic acid, and mixtures thereof.

2. A process for canning peaches, which comprises:
(a) halving and pitting fresh peaches,
(b) dipping the peaches for a period of about 3 to 10 minutes in a solution consisting solely of water, about 0.1 to 0.5% calcium chloride, and about 0.5 to 2% ascorbic acid, said solution being at a temperature of about 120–180° F.,
(c) holding the so-dipped peaches under anaerobic conditions at a temperature of about 30 to 35° F. while immersed in a solution consisting solely of water and about 0.25 to 0.5% of an acid selected from the group consisting of citric acid, lactic acid, and mixtures thereof, and continuing the holding of the peaches in the aforesaid manner for a period of several weeks to about 8 months, and
(d) withdrawing the peaches from the said solution and peeling and canning them.

| | Treatment conditions | | Product evaluation | | |
|---|---|---|---|---|---|
| Lot | Dip | Storage medium | Appearance | Texture | Aroma |
| 1 | Not used | $N_2$ gas | Brown, moldy | Mushy | Poor. |
| 2 | do | 0.5% citric acid | Translucent | Soft | Do. |
| 3 | 3 min., ambient temperature, 0.5% $CaCl_2$, 2% ascorbic acid | do | Good | Firm | Good. |
| 4 | 5 min., 130° F., 0.5% $CaCl_2$, 2% ascorbic acid | do | Excellent | Very firm | Excellent. |
| 5 | do | 0.5% lactic acid | do | do | Do. |
| 6 | do | 0.25% citric acid, 0.25 lactic acid | do | do | Do. |

The peaches in Lot 4 were canned in 40° Brix sugar syrup according to standard procedures. In a similar manner, fresh peaches were also canned. No differences between the two canned products could be detected either in appearance, texture, or aroma.

We claim:

1. A process for holding peaches in a fresh condition between the time they have been harvested and the time they are processed by canning, which comprises:
(a) dipping fresh, pitted peaches for a period of about 3 to 10 minutes in a solution consisting solely of water, about 0.1 to 0.5 calcium chloride, and about 0.5 to 2% ascorbic acid, said solution being at a temperature of about 120–180° F., and
(b) storing the so-dipped peach halves under essen-

References Cited
UNITED STATES PATENTS

| | | | |
|---|---|---|---|
| 2,475,838 | 7/1949 | Johnson et al. | 99—103 |
| 2,780,551 | 2/1957 | Guadagni | 99—100 R X |
| 2,874,059 | 2/1959 | Powers et al. | 99—154 X |
| 2,992,114 | 7/1961 | Weaver | 99—154 |
| 3,008,838 | 11/1961 | Brunsing et al. | 99—154 X |
| 3,245,807 | 4/1966 | Colby | 99—186 |
| 3,597,235 | 8/1971 | Kramer | 99—154 |

NORMAN YUDKOFF, Primary Examiner

K. P. VAN WYCK, Assistant Examiner

U.S. Cl. X.R.

426—325, 333, 419